United States Patent
Kang et al.

(10) Patent No.: US 7,742,868 B2
(45) Date of Patent: Jun. 22, 2010

(54) METHOD AND APPARATUS FOR CONTROLLING FUEL REFORMING UNDER LOW-LOAD OPERATING CONDITIONS USING EXHAUST RECOMPRESSION IN A HOMOGENEOUS CHARGE COMPRESSION IGNITION ENGINE

(75) Inventors: Jun-Mo Kang, Ann Arbor, MI (US); Chen-Fang Chang, Troy, MI (US); Tang-Wei Kuo, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 318 days.

(21) Appl. No.: 12/045,295

(22) Filed: Mar. 10, 2008

(65) Prior Publication Data

US 2008/0243356 A1 Oct. 2, 2008

Related U.S. Application Data

(60) Provisional application No. 60/908,195, filed on Mar. 27, 2007.

(51) Int. Cl.
*G06F 19/00* (2006.01)
*F02M 51/00* (2006.01)
*F02M 25/07* (2006.01)
*F01L 1/34* (2006.01)
*F02D 41/14* (2006.01)

(52) U.S. Cl. .................... 701/105; 123/299; 123/90.15; 123/568.14; 123/679; 701/104; 701/109

(58) Field of Classification Search .............. 123/90.11, 123/90.15–90.18, 76, 295, 299, 300, 305, 123/316, 568.11, 568.14, 672, 679; 701/101–105, 701/108–111, 115; 60/274, 276, 285
See application file for complete search history.

(56) References Cited

U.S. PATENT DOCUMENTS

| | | | | |
|---|---|---|---|---|
| 4,248,193 | A * | 2/1981 | Choma et al. ............... | 123/350 |
| 5,996,337 | A * | 12/1999 | Blosser et al. ............... | 60/274 |
| 6,276,334 | B1 | 8/2001 | Flynn et al. | |
| 6,578,533 | B1 | 6/2003 | Gray, Jr. | |
| 6,953,024 | B2 * | 10/2005 | Linna et al. ................. | 123/435 |
| 7,093,568 | B2 | 8/2006 | Yang | |
| 7,104,248 | B2 | 9/2006 | Weiss | |
| 7,275,516 | B1 * | 10/2007 | Cunningham et al. ....... | 123/305 |
| 7,367,313 | B2 * | 5/2008 | Chang et al. ................ | 123/305 |
| 7,370,616 | B2 * | 5/2008 | Kuo et al. ................ | 123/90.15 |
| 7,621,256 | B2 * | 11/2009 | Cunningham et al. ....... | 123/305 |
| 7,631,492 | B2 * | 12/2009 | Suresh et al. ............ | 123/90.15 |
| 2002/0139358 | A1* | 10/2002 | Ma .......................... | 123/679 |
| 2009/0164104 | A1* | 6/2009 | Wermuth et al. ............ | 701/105 |
| 2009/0272362 | A1* | 11/2009 | Yun et al. .................... | 123/295 |
| 2009/0272363 | A1* | 11/2009 | Yun et al. .................... | 123/295 |

* cited by examiner

*Primary Examiner*—Willis R Wolfe, Jr.

(57) ABSTRACT

A direct injection spark ignition multi-cylinder internal combustion engine operative in a controlled auto-ignition combustion mode includes a direct fuel injection system, a spark ignition system and a controllable engine valve system. The air/fuel ratio in the exhaust gas feedstream and an intake mass air flow are measured and an actual air/fuel ratio is calculated based upon the intake mass air flow and engine fueling. Magnitude of a negative valve overlap period between an exhaust valve closing and an intake valve opening is adjusted based upon the measured mass air flow. Timing of pre-injection fueling is adjusted during the negative valve overlap period based upon the measured air/fuel ratio.

20 Claims, 3 Drawing Sheets

METHOD AND APPARATUS FOR CONTROLLING FUEL REFORMING UNDER LOW-LOAD OPERATING CONDITIONS USING EXHAUST RECOMPRESSION IN A HOMOGENEOUS CHARGE COMPRESSION IGNITION ENGINE

CROSS REFERENCE TO RELATED APPLICATIONS

This application claims priority from U.S. Provisional Application No. 60/908,195, filed on Mar. 27, 2007, which is hereby incorporated herein by reference.

TECHNICAL FIELD

This disclosure relates to operation and control of homogeneous-charge compression-ignition ('HCCI') engines.

BACKGROUND

The statements in this section merely provide background information related to the present disclosure and may not constitute prior art.

Known spark ignition engines introduce a fuel/air mixture into each cylinder which is compressed in a compression stroke and ignited by a spark plug. Known compression ignition engines inject pressurized fuel into a combustion cylinder near top dead center (hereafter 'TDC') of the compression stroke which ignites upon injection. Combustion for both gasoline engines and diesel engines involves premixed or diffusion flames controlled by fluid mechanics.

An engine configured for spark ignition can be adapted to operate in a homogeneous charge compression ignition (hereafter 'HCCI') mode, also referred to as controlled auto-ignition combustion, under predetermined speed/load operating conditions. The controlled auto-ignition combustion comprises a distributed, flameless, auto-ignition combustion process that is controlled by oxidation chemistry. An engine operating in the HCCI mode has an intake charge that is preferably homogeneous in composition, temperature, and residual exhaust gases at intake valve closing time. Controlled auto-ignition combustion is a distributed kinetically-controlled combustion process with the engine operating at a dilute fuel/air mixture, i.e., lean of a fuel/air stoichiometric point, with relatively low peak combustion temperatures, resulting in low NOx emissions. The homogeneous fuel/air mixture minimizes occurrences of rich zones that form smoke and particulate emissions.

When an engine operates in the HCCI mode, the engine control comprises lean air/fuel ratio operation with the throttle wide open to minimize engine pumping losses. When the engine operates in the spark-ignition combustion mode, the engine control comprises stoichiometric air/fuel ratio operation, with the throttle valve controlled over a range of positions from 0% to 100% of the wide-open position to control intake air flow to achieve the stoichiometric air/fuel ratio. It is known that combustion in each cylinder can vary significantly due to differences in individual fuel injector characteristics and other factors in a multi-cylinder HCCI engine.

Known engine valve control strategies comprise an exhaust recompression strategy to control the cylinder charge temperature by trapping hot residual gas from the previous combustion cycle. This can include advancing closing timing of the exhaust valve and correspondingly delaying opening timing of the intake valve, preferably symmetrical to the exhaust valve closing timing about TDC of the intake stroke to create a negative valve overlap (hereafter 'NVO') period. The NVO period is defined as a crank angle duration between the exhaust valve closing and the intake valve opening. The cylinder charge composition and temperature are affected by the exhaust valve closing timing. In particular, greater amounts of hot residual gas from the previous combustion cycle can be retained with the advanced closing of the exhaust valve, reducing incoming fresh air mass into the cylinder, resulting in increased cylinder charge temperature and lower cylinder charge oxygen concentration.

It is known to couple the engine valve control strategy and a fuel injection strategy to stabilize combustion. For example, at a low fueling rate, temperature of the cylinder charge may preclude achieving stable auto-ignited combustion of the cylinder charge regardless of the NVO period. It is known to increase temperature of the cylinder charge by pre-injecting fuel into the combustion chamber, preferably during the NVO period. A portion of the pre-injected fuel reforms due to pressure and temperature during recompression, releasing heat energy and increasing the cylinder charge temperature to achieve auto-ignited combustion of the cylinder charge created by a subsequent main fueling during the compression stroke. It is known that the amount of auto-thermal fuel reforming is based upon mass and timing of the pre-injection fueling, with the fuel reforming increasing with earlier timing of the pre-injection fueling and/or greater fuel mass of the pre-injection fueling. It is known that an amount of fuel reforming that is greater than required for stable combustion can increase brake-specific fuel consumption, and that an amount of fuel reforming that is less than required for stable combustion can increase combustion instability. Fuel reforming can vary due to injection timing, trapped exhaust gas temperature and pressure, and other factors.

SUMMARY

A direct injection spark ignition multi-cylinder internal combustion engine operative in a controlled auto-ignition combustion mode includes a direct fuel injection system, a spark ignition system and a controllable engine valve system. An air/fuel ratio in the exhaust gas feedstream and an intake mass air flow are measured. An actual air/fuel ratio is calculated based upon the intake mass air flow and engine fueling. Magnitude of a negative valve overlap period between an exhaust valve closing and an intake valve opening is adjusted to achieve a preferred intake mass air flow based upon the measured mass air flow. Timing of pre-injection fueling is adjusted during the negative valve overlap period based upon the measured air/fuel ratio.

BRIEF DESCRIPTION OF THE DRAWINGS

One or more embodiments will now be described, by way of example, with reference to the accompanying drawings, in which.

DETAILED DESCRIPTION

Figure 1:
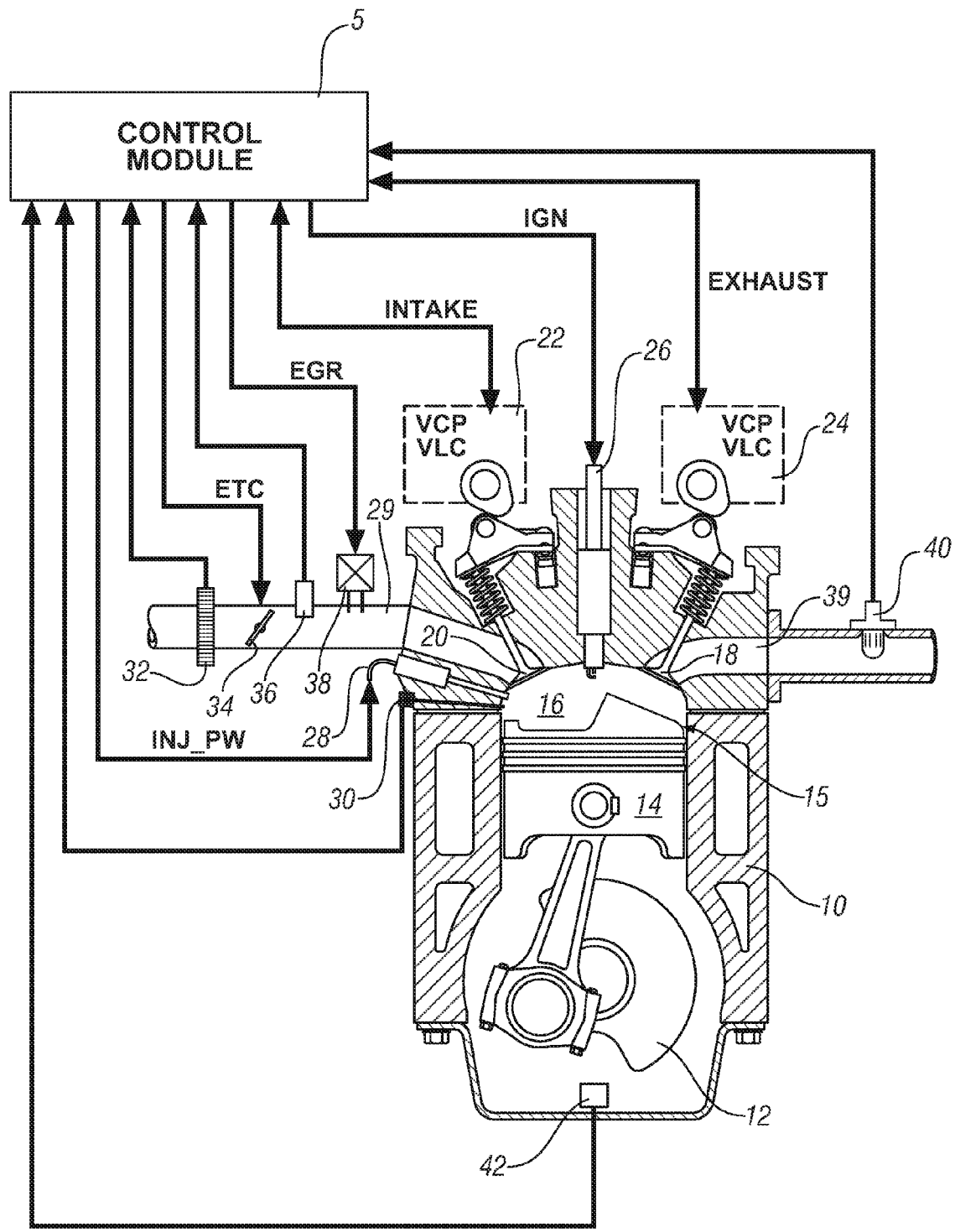
FIG. 1 is a schematic diagram of an engine system, in accordance with the present disclosure.

Referring now to the drawings, wherein the showings are for the purpose of illustrating certain exemplary embodiments only and not for the purpose of limiting the same, FIG. 1 schematically illustrates an exemplary internal combustion engine 10 and accompanying control module 5 ('CONTROL MODULE') that have been constructed in accordance with an embodiment of the disclosure. The engine 10 is selectively operative in a controlled auto-ignition mode and a spark-ignition mode. The engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1.

An air intake system channels intake air to an intake manifold 29 which directs and distributes the air into an intake passage to each combustion chamber 16. The air intake system comprises air flow ductwork and devices for monitoring and controlling the air flow. The devices preferably include a mass air flow sensor 32 for monitoring mass air flow and intake air temperature. A throttle valve 34, preferably comprising an electronically controlled device controls air flow to the engine 10 in response to a control signal ('ETC') from the control module 5. A pressure sensor 36 is adapted to monitor manifold absolute pressure in the intake manifold 29. An external flow passage (not shown) recirculates exhaust gases from an exhaust manifold 39 to the intake manifold 29, controlled by an exhaust gas recirculation (hereafter 'EGR') control valve 38. The control module 5 controls mass flow of exhaust gas to the engine air intake by controlling opening of the EGR control valve 38.

One or more intake valve(s) 20 control air flow from the intake passage into the combustion chamber 16. One or more exhaust valve(s) 18 control exhaust flow out of the combustion chamber 16 to the exhaust manifold 39. Openings and closings of the intake and exhaust valves 20 and 18 are preferably controlled with a dual camshaft (as depicted), the rotations of which are linked and indexed with rotation of the crankshaft 12. Device 22 preferably comprises a controllable mechanism operative to variably control valve lift ('VLC') and variably control cam phasing ('VCP') of the intake valve(s) 20 for each cylinder 15 in response to a control signal ('INTAKE') from the control module 5. Device 24 preferably comprises a controllable mechanism operative to variably control valve lift ('VLC') and variably control cam phasing ('VCP') of the exhaust valve(s) 18 for each cylinder 15 in response to a control signal ('EXHAUST') from the control module 5. Devices 22 and 24 each preferably comprises a controllable two-step valve lift mechanism operative to control magnitude of valve lift, or opening, to one of two discrete steps, e.g., a low-lift valve open position (about 4-6 mm) for load speed, low load operation, and a high-lift valve open position (about 8-10 mm) for high speed and high load operation. Devices 22 and 24 comprise variable cam phasing mechanisms to control phasing (i.e., relative timing) of opening and closing of the intake valve(s) 20 and the exhaust valve(s) 18 respectively. The variable cam phasing mechanisms shift valve opening time relative to positions of the crankshaft 12 and piston 14, referred to as phasing. The preferred VCP system may have a range of phasing authority of 60°-90° of crank rotation, thus permitting the control module 5 to advance or retard opening and closing of one of the intake valves 20 and the exhaust valves 18 relative to position of the piston 14. The range of phasing authority is defined and limited by the devices 22 and 24. Devices 22 and 24 include camshaft position sensors (not shown) to determine rotational positions of the intake and the exhaust camshafts (not shown). Devices 22 and 24 are actuated using one of electro-hydraulic, hydraulic, and electric control force, controlled by the control module 5. Devices 22 and 24 and the intake exhaust valve(s) 18 and 20 are elements included in a controllable engine valve system.

Devices 22 and 24 can be controlled to achieve a negative valve overlap period by controlling phasings and/or lift magnitudes for either one or both of the intake and exhaust valves 20 and 18. The negative valve overlap period is achieved by advancing the phasing of the exhaust valve 18 and correspondingly retarding phasing of the intake valve 20. The negative valve overlap period is created at the end of the exhaust stroke and the beginning of the ensuing intake stroke during which both the intake valve 20 and the exhaust valve 18 for the cylinder 15 are closed. Fuel is pre-injected into the combustion chamber 16 for reforming during each negative valve overlap period. The portion of the pre-injected fuel that is reformed is controllable by adjusting timing and mass of the pre-injection fueling. Fuel reforming can be increased by advancing the crank angle timing of the pre-injection fueling, and/or by increasing the mass of the pre-injection fueling. Similarly, fuel reforming can be decreased by retarding the crank angle timing of the pre-injection fueling, and/or by decreasing the mass of the pre-injection fueling.

A fuel injection system comprises a plurality of high-pressure fuel injectors 28 to directly inject a mass of fuel into each of the combustion chamber 16 in response to one or more control signals ('INJ_PW') from the control module 5. The fuel injectors 28 are supplied pressurized fuel from a fuel distribution system (not shown). Fuel can be injected during a single fueling event for each cylinder 15 for each combustion cycle. During operation in the controlled auto-ignition mode there can be multiple fueling events for each cylinder 15 for each combustion cycle, including pre-injection fueling during a negative valve overlap period of the combustion cycle, and a main fueling preferably initiated during the compression stroke. The control signal(s) from the control module 5 consist of the crank angle timing for start of fuel injection and the duration of the injection pulsewidth. The timing for start of each fuel injection event is defined in terms of the crank angle defining the position of the piston 14 in the cylinder 15, and the pulsewidth duration is defined to inject a predetermined fuel mass from the fuel injector 28 into the cylinder 15.

A spark ignition system provides spark energy to a spark plug 26 for igniting or assisting in igniting cylinder charges in each combustion chamber 16, in response to a control signal ('IGN') from the control module 5. The spark plug 26 enhances control of combustion phasing in each cylinder 15 of the engine 10 at certain conditions, e.g., during cold start and near a low load operation limit.

Sensing devices monitor engine operation, including a crank sensor 42 operative to monitor crankshaft rotational position, i.e., crank angle and speed, a wide range air/fuel ratio sensor 40 adapted to monitor air/fuel ratio in the exhaust gas feedstream, and a combustion sensor 30 adapted to monitor in-cylinder combustion in real-time, during ongoing operation of the engine 10. The combustion sensor 30 comprises a sensor device operative to monitor a state of a combustion parameter and is depicted as a cylinder pressure sensor operative to monitor in-cylinder combustion pressure.

The output of the combustion sensor 30 and the crank sensor 42 are monitored by the control module 5 which determines the combustion phasing, i.e., timing of combustion pressure relative to the crank angle of the crankshaft 12 and position of the piston 14 for each cylinder 15 for each combustion cycle. The combustion sensor 30 can also be monitored by the control module 5 to determine a mean-effective-pressure (hereafter 'IMEP') for each cylinder 15 for each combustion cycle. Alternatively, other sensing systems can be used to monitor real-time in-cylinder combustion parameters which can be translated into combustion phasing, e.g., ion-sense ignition systems and non-intrusive cylinder pressure monitoring systems.

During operation in the controlled auto-ignition combustion mode, the engine 10 operates un-throttled on gasoline or similar fuel blends over an extended range of engine speeds and loads. The engine 10 operates in the spark ignition combustion mode with a controlled throttle operation under conditions not conducive to the controlled auto-ignition combustion mode operation, and to achieve engine power to meet an operator torque request. Widely available grades of gasoline and light ethanol blends thereof are preferred fuels; however, alternative liquid and gaseous fuels such as higher ethanol blends (I E80, E85), neat ethanol (E99), neat methanol (M100), natural gas, hydrogen, biogas, various reformates, syngases, and others may be used in the implementation of the present disclosure.

The control module 5 preferably comprises a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital conversion circuitry and digital to analog circuitry, and input/output circuitry and devices, and appropriate signal conditioning and buffer circuitry. The control module 5 has a set of control algorithms, comprising resident program instructions and calibrations stored in the non-volatile memory and executed to provide the respective functions of each computer. The algorithms are executed during preset loop cycles such that each algorithm is executed at least once each loop cycle. Algorithms are executed by the central processing unit to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event.

Figure 2:
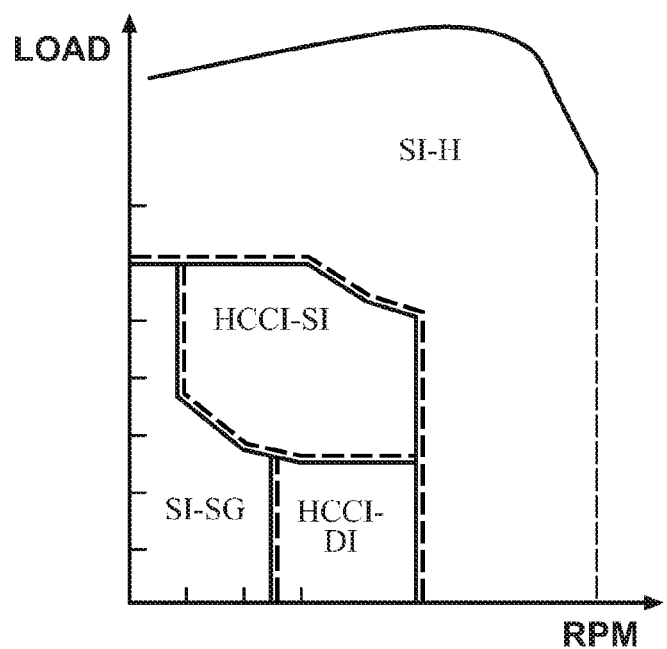
FIG. 2 is a graphical depiction, in accordance with the present disclosure.

FIG. 2 schematically depicts preferred operating ranges for the exemplary engine 10 in spark-ignition and controlled auto-ignition combustion modes, based upon states of engine parameters, in this embodiment comprising speed ('RPM') and load ('LOAD') which is derivable from engine parameters including the engine fuel flow and the intake manifold 29 pressure. The engine combustion modes preferably comprise a spray-guided spark-ignition ('SI-SG') mode, a single injection controlled auto-ignition ('HCCI-SI') mode, and double injection controlled auto-ignition ('HCCI-DI') mode, and a homogeneous spark-ignition ('SI-H') mode. A preferred speed and load operating range for each of the combustion modes is based upon engine operating parameters, including combustion stability, fuel consumption, emissions, engine torque output, and others. Boundaries which define the preferred speed and load operating ranges to delineate operation in the aforementioned combustion modes are preferably precalibrated and stored in the control module 5.

Figure 3:
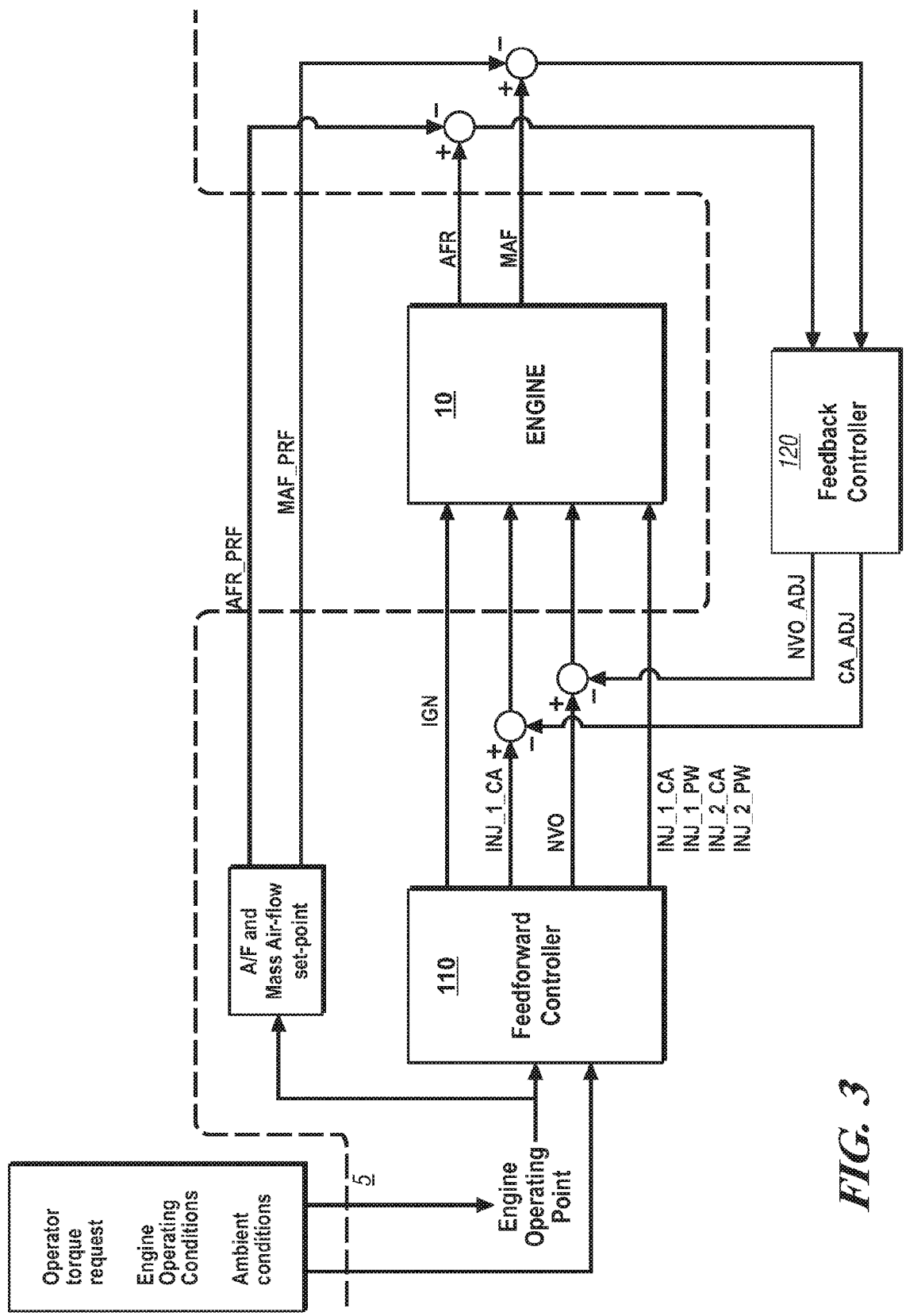
FIG. 3 is a schematic block diagram of a control scheme, in accordance with the present disclosure; and, FIG. 4 is a data graph, in accordance with the present disclosure.

FIG. 3 depicts a control scheme executed in the control module 5 for operating the engine 10 in the controlled auto-ignition combustion mode. Engine operating conditions, ambient conditions, and the operator torque request are monitored. The control module 5 determines a preferred engine operating point based upon the operator torque request and the engine operating conditions and ambient conditions, described in terms of engine speed and load. The control module 5 determines a total fueling mass, a preferred air/fuel ratio set point ('AFR_PRF') and a preferred mass air flow set point ('MAF_PRF') based upon the engine operating conditions and ambient conditions to achieve the preferred engine operating point. The engine operating conditions, ambient conditions, and the preferred engine operating point are input to a feed-forward controller 110, which determines control states, including the spark ignition timing ('IGN'), timing for the pre-injection fueling ('INJ_1_CA') and pulsewidth of the pre-injection fueling ('INJ_1_PW'), and timing of the main fueling ('INJ_2_CA') and pulsewidth of the main fueling ('INJ_2_PW'), and any subsequent fuel injection events (not shown), which are output to the engine 10 to effect control thereof during each combustion cycle. The feed-forward controller 110 also determines a preferred negative valve overlap period ('NVO') for the intake and exhaust valves 20 and 18 and corresponding control states for devices 22 and 24 to achieve the preferred negative valve overlap period. Other engine operating states are controlled, including, e.g., EGR flow.

The control module 5 monitors operation of the engine 10, including measuring engine intake mass air flow ('MAF') with the mass air flow sensor 32 and measuring the exhaust gas air/fuel ratio ('AFR') with the wide range air/fuel ratio sensor 40. An actual air/fuel ratio is calculated, comprising a mathematical ratio consisting of the intake mass air flow divided by the total engine fueling. A difference between the preferred air/fuel ratio set point and the measured exhaust gas air/fuel ratio is determined and a difference between the preferred mass air flow set point and the measured mass air flow is determined and input to a feedback controller 120. The feedback controller 120 determines an adjustment for the negative valve overlap period ('NVO_ADJ') and an adjustment for the crank angle timing of the pre-injection fueling ('CA_ADJ') which are combined with the negative valve overlap period ('NVO') and the crank angle timing of the pre-injection fueling ('INJ_1_CA') to control operation of the engine 10. Preferably, the control scheme executed as one or more algorithms in the control module 5.

The exemplary wide range air/fuel ratio sensor 40 generates an output signal having characteristics useable for controlling the engine 10. The output signal of the wide range air/fuel ratio sensor 40 comprises an electrical pumping current $I_p$ which is expressible as a sum of two current components in Eq. 1 as follows:

$$I_p = I_{pI} + I_{pr}; \qquad [1]$$

wherein $I_{pI}$ comprises a positive current corresponding to a partial pressure of oxygen in the exhaust gas, and $I_{pr}$ comprises a negative current corresponding to partial pressures of hydrogen and carbon monoxide in the exhaust gas. When the engine 10 is operating in a combustion mode without fuel reforming or a negative valve overlap period, the negative current $I_{pr}$ may be ignored in a lean exhaust gas environment because concentrations of hydrogen and carbon monoxide in the exhaust gas feedstream are insignificant. Similarly, the pumping current $I_p$ is approximately equal to the negative current $I_{pr}$ in a rich exhaust gas environment because oxygen concentration in the exhaust gas feedstream can be negligible. The currents $I_{pl}$ and $I_{pr}$ are proportional to the oxygen amount in the exhaust gas feedstream and proportional to the oxygen amount required for the complete combustion reaction of combustible gas in the exhaust gas feedstream, as demonstrated by the following formula in Eq. 2:

Thus, the pumping current $I_p$ corresponds to the actual air/fuel ratio in the exhaust gas feedstream without fuel reforming. However, the rate of change in the positive current $I_{pl}$ with change in oxygen concentration and the rate of change in the negative current $I_{pr}$ with the change in the combustible gas are not the same. The sensitivity of the positive current $I_{pl}$ is approximately four times less than that of the negative current $I_{pr}$ at or near stoichiometric air/fuel ratio. This is because the diffusion rates of hydrogen, carbon monoxide and oxygen in the wide range air/fuel ratio sensor 40 differ. For example, carbon monoxide molecules have a mass similar to oxygen molecules, i.e., both diffuse at the approximately the same rate through the porous layer of the wide range air/fuel ratio sensor 40, whereas hydrogen diffuses at a higher rate than oxygen due to smaller molecular mass. Thus, if combustible gases such as carbon monoxide and hydrogen exist in a lean exhaust gas feedstream, an excess of oxygen is required to compensate the negative current $I_{pr}$ because of the carbon monoxide and hydrogen concentrations in the porous layer, resulting in a lower pumping current $I_p$ than occurs without combustible gas. The lean exhaust gas feedstream is defined as having more mass of oxygen than is necessary to complete a combustion reaction of the combustible gas in Eq. 2, due to higher diffusion rate of hydrogen. Thus the measured air/fuel ratio from the wide range air/fuel ratio sensor 40 is lower than the actual air/fuel ratio in the exhaust gas feedstream, and the magnitude of an air/fuel ratio error, i.e., a difference between the measured air/fuel ratio and the actual air/fuel ratio, is proportional to the carbon monoxide and hydrogen concentrations. In operation, the engine 10 is controlled by the control module 5 through execution of algorithmic code to control fuel reforming based upon the measured air/fuel ratio output from the wide range air/fuel ratio sensor 40.

Reforming of the injected fuel generates a significant in-cylinder concentrations of hydrogen and carbon dioxide, due to high temperature from the main combustion event which follows fuel reforming, described in Eq. 3 as follows:

wherein n, m, and x are defined by the molecular structure of the injected fuel and the oxygen concentration.

Figure 4:
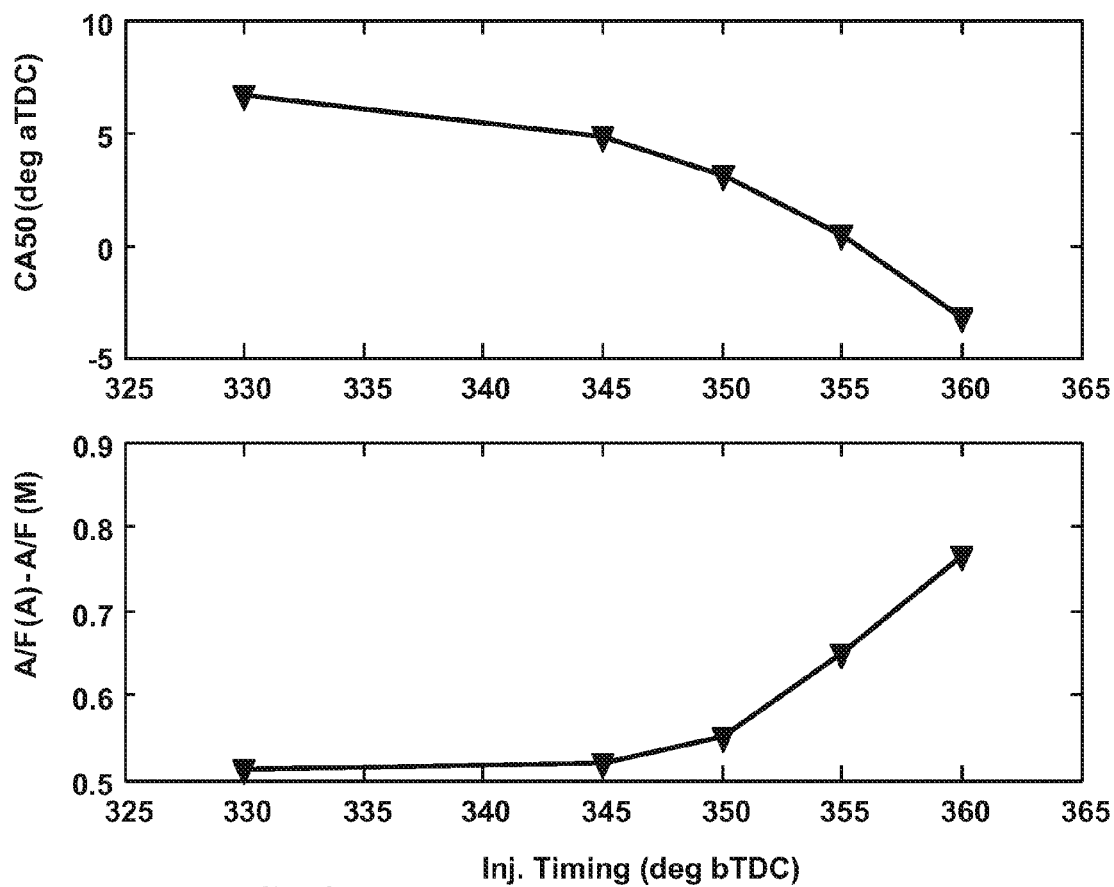

FIG. 4 depicts experimental data from operating an engine constructed in accordance with the engine 10 and control system described hereinabove. The engine 10 was operated with the crank angle timing of the pre-injection fueling varying over a range of engine crank angles. The results show differences in the measured air/fuel ratio output from the wide range air/fuel ratio sensor 40 ('A/F(M)') and a carbon-based air/fuel ratio measured from an emission bench ('A/F(A)'), and the combustion phasing indicated by a crank angle location of 50% of fuel mass burned ('CA50(deg aTDC)'), plotted over a range of pre-injection fueling timings measured in terms of crank angle degrees before top-dead-center ('Inj. Timing deg bTDC'). The carbon-based air/fuel ratio measured from the emission bench ('A/F(A)') represents the actual air/fuel ratio, described above as being the mathematical ratio calculated by dividing the intake mass air flow by the total engine fueling that is determined by the control module 5.

The results demonstrate that as timing of the pre-injection fueling is delayed or retarded, the combustion phasing advances and the air/fuel ratio difference ('A/F(A)–A/F(M)') becomes larger with an increase in the amount of fuel reforming. Thus, the amount of fuel reforming can be determined based upon a difference between the measured air/fuel ratio and the actual air/fuel ratio.

The amount of fuel reforming therefore can be controlled by controlling the measured air/fuel ratio output from the wide range air/fuel ratio sensor 40 and controlling the actual air/fuel ratio. The actual air/fuel ratio can be controlled by controlling the total fueling to the engine and controlling the opening and closing timing of the intake and exhaust valves 20 and 18 to control the mass air flow into the engine.

The control scheme depicted in FIG. 3 shows the mass air flow is measured at the mass air flow sensor 32 and the total mass of fuel injected into each combustion chamber 16 consisting of the pre-injection fueling and the main injection fueling is controlled. The control scheme operates to control the NVO to control the air flow to achieve the preferred actual air/fuel ratio for the total mass of fuel. Concurrently, the measured air/fuel ratio is controlled to the preferred measured air/fuel ratio based upon the signal output by the wide range air/fuel ratio sensor 40, preferably by controlling the fuel injector 28 to adjust timing of the pre-injection fueling to adjust the fuel reforming. The preferred measured air/fuel ratio is lower than the preferred actual air/fuel ratio. The actual air/fuel ratio is proportional to the intake air flow. The measured air/fuel ratio is inversely proportional to the actual amount of fuel reforming. Thus, the actual air/fuel ratio and the measured air/fuel ratio are independently controlled. The feedback controller 120 is designed using multi-input, multi-output control techniques which determine the adjustment for the negative valve overlap period ('NVO_ADJ') and the adjustment for the pre-injection crank angle ('CA_ADJ').

The control module 5 controls operation of the internal combustion engine 10 in the controlled auto-ignition mode based upon the engine speed and load operating conditions described with reference to FIG. 2. The controlled auto-ignition mode preferably includes operating the engine 10 with the throttle valve 34 commanded wide-open. Fuel injection timing and mass are calculated and executed to create a homogeneous fuel/air charge in each combustion chamber 16 which achieves an engine speed/load operating point to meet engine and operator demands. The control method is reduced to executable algorithmic code stored in the control module 5.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an internal combustion engine including a direct fuel injection system, a spark ignition system and a controllable engine valve system, comprising:
   operating the engine in a controlled auto-ignition mode;
   measuring an air/fuel ratio in an exhaust gas feedstream;
   measuring an intake mass air flow;
   determining an actual air/fuel ratio based upon the measured intake mass air flow and an engine fueling;
   adjusting magnitude of a negative valve overlap period between an exhaust valve closing and an intake valve opening based upon the measured intake mass air flow; and
   controlling timing of pre-injection fueling during the negative valve overlap period based upon the measured air/fuel ratio.

2. The method of claim 1, comprising adjusting the magnitude of the negative valve overlap period and controlling the timing of pre-injection fueling during the negative valve overlap period based upon the measured air/fuel ratio and the measured mass air flow.

3. The method of claim 1, further comprising:
   determining a preferred engine operating point;
   determining a preferred intake mass air flow based upon the preferred engine operating point; and
   adjusting the magnitude of the negative valve overlap period between the exhaust valve closing and the intake valve opening based upon a difference between the preferred intake mass air flow and the measured intake mass air flow.

4. The method of claim 3, comprising decreasing the negative valve overlap period between the exhaust valve closing and the intake valve opening to increase the measured intake mass air flow.

5. The method of claim 3, comprising increasing the negative valve overlap period between the exhaust valve closing and the intake valve opening to decrease the measured intake mass air flow.

6. The method of claim 5, comprising simultaneously equally advancing the exhaust valve closing and retarding the intake valve opening to increase the magnitude of the negative valve overlap period.

7. The method of claim 5, comprising simultaneously equally retarding the exhaust valve closing and advancing the intake valve opening to decrease the magnitude of the negative valve overlap period.

8. The method of claim 1, wherein operating the engine in the controlled auto-ignition mode comprises controlling an engine intake air throttle to a substantially wide-open position and controlling timings of injections of the engine fueling comprising the pre-injection fueling and a main fueling.

9. The method of claim 8, comprising:
   calculating an actual air/fuel ratio for the engine fueling;
   determining an amount of fuel reforming; and
   controlling timing of the pre-injection fueling during the negative valve overlap period based upon the amount of fuel reforming and the actual engine air/fuel ratio.

10. The method of claim 9, comprising determining the amount of fuel reforming based upon a difference between the actual air/fuel ratio and the measured air/fuel ratio.

11. The method of claim 10, comprising advancing timing of the pre-injection fueling during the negative valve overlap period to increase the amount of fuel reforming.

12. The method of claim 10, comprising retarding timing of the pre-injection fueling during the negative valve overlap period to decrease the amount of fuel reforming.

13. Method for operating an internal combustion engine in a controlled auto-ignition combustion mode, comprising:
   determining a preferred engine operating point;
   determining a fueling rate, a preferred air/fuel ratio and a preferred mass air flow based upon the preferred engine operating point;
   measuring an air/fuel ratio of the exhaust gas feedstream;
   measuring mass air flow of engine intake air;
   determining an actual air/fuel ratio based upon the measured mass air flow and the fueling rate;
   controlling engine valve timing to achieve a preferred negative valve overlap period based upon the preferred air/fuel ratio; and
   controlling timing of a pre-injection fueling during the negative valve overlap period to achieve a preferred amount of fuel reforming.

14. The method of claim 13, comprising determining the amount of fuel reforming based upon a difference between the actual air/fuel ratio and the measured air/fuel ratio.

15. The method of claim 14, further comprising:
   determining the amount of fuel reforming based upon a difference between the actual air/fuel ratio and the measured air/fuel ratio; and
   increasing the difference between the actual air/fuel ratio and the measured air/fuel ratio by advancing timing of the pre-injection fueling to increase the amount of fuel reforming.

16. The method of claim 14, further comprising decreasing the difference between the actual air/fuel ratio and the measured air/fuel ratio by retarding timing of the pre-injection fueling to decrease the amount of fuel reforming.

17. Method for controlling fuel reforming in a direct injection spark ignition internal combustion engine operating in a controlled auto-ignition combustion mode, comprising:
   determining a preferred engine operating point based upon an operator torque request;
   determining a fueling rate, a preferred air/fuel ratio and a preferred mass air flow based upon the preferred engine operating point;
   measuring an air/fuel ratio of the exhaust gas feedstream;
   measuring mass air flow of engine intake air;
   determining an actual air/fuel ratio based upon the measured mass air flow and the fueling rate; and
   controlling timing of a pre-injection fueling during the negative valve overlap period based upon a difference between the actual air/fuel ratio and the measured air/fuel ratio.

18. The method of claim 17, further comprising controlling engine valve timing to achieve a preferred negative valve overlap period based upon the preferred air/fuel ratio.

19. The method of claim 17, further comprising advancing timing of the pre-injection fueling during the negative valve overlap period to increase the amount of fuel reforming.

20. The method of claim 19, further comprising retarding timing of the pre-injection fueling during the negative valve overlap period to decrease the amount of fuel reforming.

* * * * *